United States Patent [19]

Burch et al.

[11] Patent Number: 4,879,733
[45] Date of Patent: Nov. 7, 1989

[54] TIMER ARCHITECTURE FOR MULTI-TASK COMPUTERS AND FOR SERIAL DATA DECODING

[75] Inventors: Kenneth R. Burch, Austin, Tex.; Mario A. Rivas, West Palm Beach, Fla.

[73] Assignee: Motorola, Inc., Schaumburg, Ill.

[21] Appl. No.: 149,323

[22] Filed: Jan. 28, 1988

[51] Int. Cl.[4] ...................... H03K 21/38; H03K 21/10
[52] U.S. Cl. ......................................... 377/44; 377/52; 377/56; 377/110; 377/20; 368/156; 328/130.1
[58] Field of Search .................... 377/44, 47, 52, 56, 377/20; 328/129.1, 130.1; 368/73, 107, 110, 113, 155, 156

[56] References Cited

U.S. PATENT DOCUMENTS

| | | | |
|---|---|---|---|
| 3,639,844 | 2/1972 | Karklys | 328/130.1 |
| 4,035,661 | 7/1977 | Carlson | 328/130.1 |
| 4,131,855 | 12/1978 | Hamagawa | 328/129.1 |
| 4,184,320 | 1/1980 | Kashio | 368/113 |
| 4,185,283 | 1/1980 | Clark | 368/250 |
| 4,376,995 | 3/1983 | Shimizu | 368/107 |
| 4,489,422 | 12/1984 | Paradise et al. | 377/44 |

OTHER PUBLICATIONS

Mitsubishi Microcontrollers, M50930-XXXFP, 8 Bit Single-Chip CMOS Microcontrollers, Feb., 1987, pp. 8–11, Publication #MDS-740-03-0287-5K.

Primary Examiner—John S. Heyman
Attorney, Agent, or Firm—Michael J. DeLuca; Vincent B. Ingrassia

[57] ABSTRACT

A timer which can be used to provide interrupt signals at predetermined but variable periods for multi-tasking microcomputers or serial data acquisition in pagers comprises a plurality of modulo counters. Each modulo counter has selectable clock inputs and has an output coupled via switches to a NOR gate and to the other modulo counters. Programmable configuring means control the switching means to configure the counters so as to produce desired outputs at the logic gate. The configuring means can also reset the modulus of the modulo counters to any desired value. Thus, the timer produces variable interrupt signals with little or no overhead processor time.

11 Claims, 3 Drawing Sheets

TIMER ARCHITECTURE FOR MULTI-TASK COMPUTERS AND FOR SERIAL DATA DECODING

FIELD OF THE INVENTION

This invention relates to timers and more particularly to timers in integrated circuits for producing timer signals to microprocessors.

BACKGROUND ART

A typical microprocessor (MCU) timer architecture is known from the Motorola '05 family of MCU's (the MC146805E2, 'F2, 'G2, 'H2) manufactured by Motorola, Inc. of 1303 East Algonquin Road, Schaumburg, Ill. 60196, USA. This general purpose timer always counts down and creates an interrupt when the timer reaches zero. A value may be loaded into the timer so that the interrupt will come at some known time. Each time the timer reaches zero or "times out", it is necessary for the processor to reload the appropriate value for the next time period Thus, this type of tier is undesirable in many applications, such as multi-tasking MCU's or serial data acquisition in pagers, because it requires a significant amount of processor overhead time to keep providing the precise, repeating time interval. The maintenance of the time intervals by the microprocessor becomes larger when the time interval varies according to the priority of a particular task to be processed when used for multi-tasking MCU's because additional processor time is required to calculate the appropriate timer value. The processor overhead problem becomes critical when the tasks must be swapped at a high rate.

A common solution is to use a single modulo timer. In this type of timer, the processor can set the timer for the desired time interval and the timer will automatically reload this value when it times out. This eliminates much of the processor overhead. However, when the data rate changes with time, the modulo timer must be reconfigured accordingly. This often results in missed or distorted time intervals during the transition period. This problem is particularly acute in applications which must operate in real time.

BRIEF SUMMARY OF THE INVENTION

It is therefore an object of the present invention to provide a timer which substantially mitigates the above problems.

It is a further object to provide a timer which reduces the amount of processor time required for reconfiguration.

Accordingly, the invention provides a timer comprising a number of modulo counters The modulus of each counter can be set independently of the other counters, the clock source of each counter is selectable, and an interrupt may be generated by any counter.

With this flexibility, it is possible to configure the modulo counters in series so that interrupt time intervals can be based on integer time intervals of other interrupt time intervals. The output of the appropriate counter is selected in interrupt the MCU. It is also possible to configure the counters to form parallel strings of counters to provide independent timing functions.

DETAILED DESCRIPTION OF THE INVENTION

Figure 1:
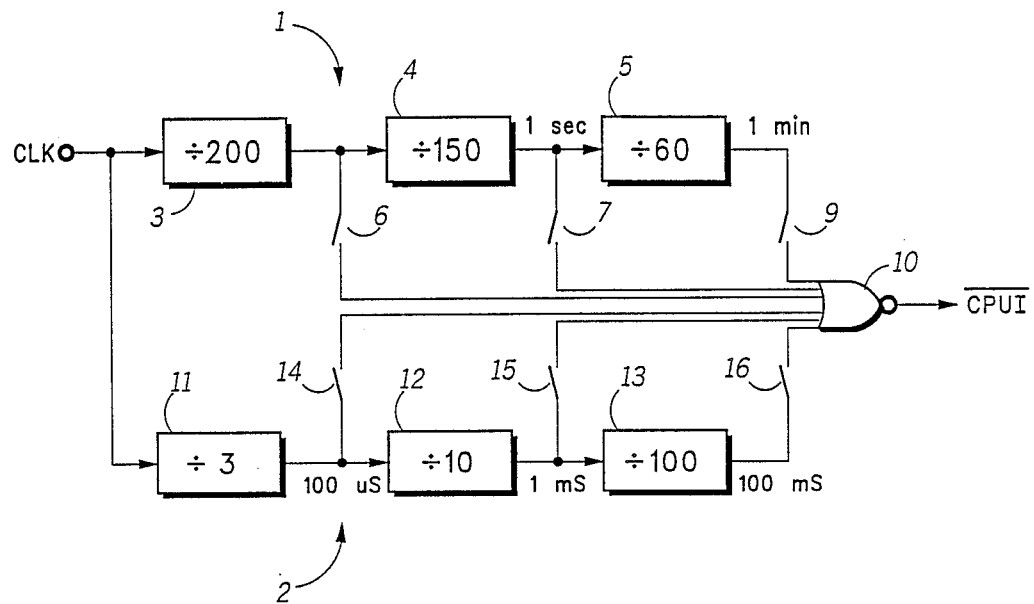
FIG. 1 illustrates in block diagram form a dual series-coupled timer according to the invention.

FIG. 1 shows the architecture of a timer according to the invention configured so as to provide two series-coupled timers 1, 2 coupled in parallel from a single clock source CLK. The clock source CLK comprises a single crystal oscillator providing an input pulse train at a frequency of 30.0 KHz. The comprises a string of modulo counters 3, 4 and 5, each having an output coupled via a respective switch 6, 7 and 9 to a NOR gate 10. The modulus of each of the counters 3, 4 and 5 is preselected to provide a desired interrupt period with a preselected clock input. This first series-coupled timer is required, for example, to provide time-of-day clock interrupts. Therefore, the first counter 3 has its input coupled to the oscillator CLK and has a modulus of 200 to give an output frequency of 150 Hz. The counter 4 has its input coupled to the output of counter 3 and therefore receives an input frequency 150 Hz. By preselecting the modulus of counter 4 to be 150, the output of counter 4 is made to be 1 Hz. This output is then used as the input for counter 5 which has a modulus of 60 and which therefore provides one output pulse per minute. Since the outputs of each of the counters 3, 4 and 5 are coupled to the NOR gate 10 via respective switches 6, 7 and 9, by suitably selecting the switches to be on or off, a desired time-of-day clock frequency in seconds or minutes can easily be output to the NOR gate 10.

In order to use the timer for timing multi-tasking in a microcomputer, different clock rates are also necessary. Thus, a second series-coupled timer 2 is provided in parallel with the first series-coupled timer 1. This second series-coupled timer 2 also consists of three modulo counters 11, 12 and 13, each having an output coupled via a respective switch 14, 15 and 16 to the NOR gate 10. In this timer, the input to counter 11 is taken from the oscillator clock CLK, the input to counter 12 is taken from the output of counter 11, and the input to counter 13 is taken from the output of counter 12. The counters 11, 12 and 13 have moduli 3, 10 and 100 respectively, so that the periods of their respective output interrupt pulses are 100 us, 1 ms and 100 ms. Again, by suitably selecting the switches 14, 15 and 16, a desired interrupt pulse frequency for the multi-tasking function can be output to the NOR gate 10. This gate 10 then provides a high output if and only if all its inputs are low. Such an output $\overline{\text{CPUI}}$ is thus the interrupt signal generated when any of the modulo counters generate an interrupt and this interrupt signal $\overline{\text{CPUI}}$ may then be passed to the microprocessor for timing purposes.

Figure 2:
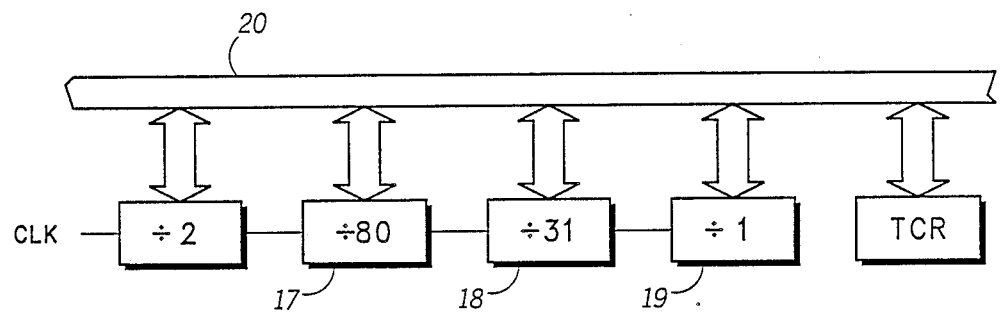
FIG. 2 illustrates in block diagram form a parallel-coupled timer according to the invention.

Alternatively, a timer according to the invention may have an architecture as shown in FIG. 2 in which three modulo counters 17, 18 and 19 are connected in parallel to a microprocessor bus 20. In this case, the oscillator clock input CLK has a frequency of 32.0 KHz and is first divided by 2 in a divider 21 before being passed on through the counters 17, 18 and 19. The modulo counters 17 and 18 have moduli 80 and 31 respectively so that interrupts are provided with periods of 5 ms and 155 ms respectively, these being required periods for receipt of bits at time intervals of 200 bps and for counting words composed of 31 bits. The modulus of counter 19 can be selected to be 1 to give the same interrupt period as counter 18 or it can be set with a different modulus so as to provide the correct counts for groups of words, for example. Each of the counters 17, 18 and 19 outputs its interrupt signals in parallel to the microprocessor bus 20 and their moduli can be cleared and/or reset via the bus 20 by the timer counter preset TCR.

Figure 3:
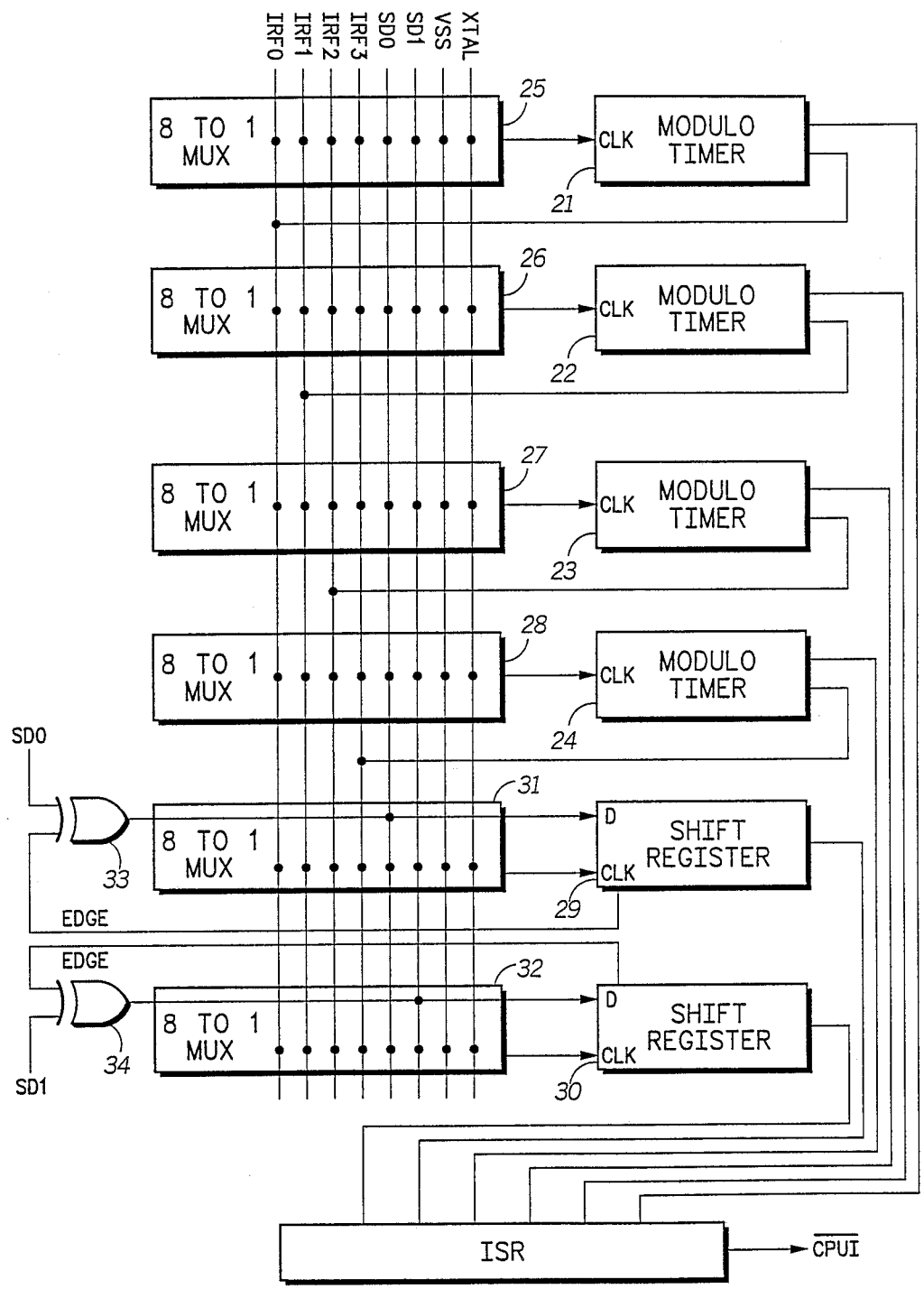
FIG. 3 illustrates the use of a timer according to the invention in a multi-tasking microcomputer.

FIG. 3 shows the architecture of a timer used in an IC for controlling multi-tasking in a microcomputer. The timer comprises four modulo timers 21, 22, 23 and 24 and is used to provide precision interrupts to the host microcomputer via the $\overline{CPUI}$ output. Each of the modulo timers has a clock input CLK which receives the output of a clock source MUX referenced 25, 26, 27 and 28 respectively. The clock source selects one of eight inputs as a clock source for the timer. These inputs are: (1) a crystal oscillator input, XTAL; (2) a ground reference potential $V_{ss}$ (no clock); (3) the output of modulo timer 21, IRF0; (4) the output of modulo timer 22, IRF1; (5) the output of modulo timer 23, IRF2; (6) the output of modulo timer 24, IRF3; (7) a first data input SD0; and (8) a second data input, SD1. The clock sources are programmed to select whichever of the inputs are required as a clock input CLK to the respective modulo timer. For example, by using XTAL as the input to modulo timer 21, and using the outputs of modulo timers 21, 22 and 23 as clock inputs to modulo timers 22, 23 and 24 respectively, an architecture similar to that of the first series-coupled timer 1, shown in FIG. 1, is achieved.

Each modulo timer is an 8 bit "set-and-forget" timer which is capable of providing precise interrupts at regular intervals with little or no processor intervention. The timer counts down from the modulus value, and when it reaches zero, the timer is automatically restored to the modulus value and its countdown continues. Each clock source contains two registers: a timer control register and a timer data register. The control register is used to determine whether an interrupt is to be generated, selects the input to the clock input CLK of the modulo timer and presets the timer when written to. By reading this register, the modulus of the timer can be displayed.

On countdown, as each timer reaches zero, an interrupt is generated and a flag is set in the appropriate control register. The interrupt can then be enabled or disabled by the register. If enabled, then that interrupt will set a master flag in an interrupt status register ISR which gives the status of the interrupts from any of the modulo timers. Such a master flag being set in the interrupt status register causes an interrupt request to be made via the output $\overline{CPUI}$. Once an interrupt request has been made, any further interrupt requests will have no effect until the interrupt status register is read.

As a result of the timer flexibility previously presented, there is a form of ambiguity present which affects signal decoding. When an interrupt occurs, it will often require a significant amount of time to recognize the IRQ, finish the present instruction or routine, determine what timer caused the interrupt, and finally take the appropriate action. This ambiguity could easily interfere with the precise sampling of incoming serial data. The solution used was to provide the ability to sample the serial data at the moment of the exact timer time out, a shift register was added to hold up to eight samples per access.

Shift registers 29 and 30 are provided to sample the state of data inputs SD0 and SD1. The shift registers have clock inputs CLK which are taken from clock sources MUX referenced 31 and 32 respectively, in the same manner as the clock sources for the modulo timers. The shift registers 29 and 30 also have D inputs which receive data signals SD0 and SD1, respectively, as their inputs, qualified via exclusive NOR gates 33 and 34 by an EDGE signal which may be used to invert the data on SD0 or SD1. These D inputs may also be used as alternative clocks for the shift registers and modulo timers. The shift registers generate interrupts which are passed to the interrupt status register and which are then dealt with similarly to those generated by the modulo timers.

Figure 4:
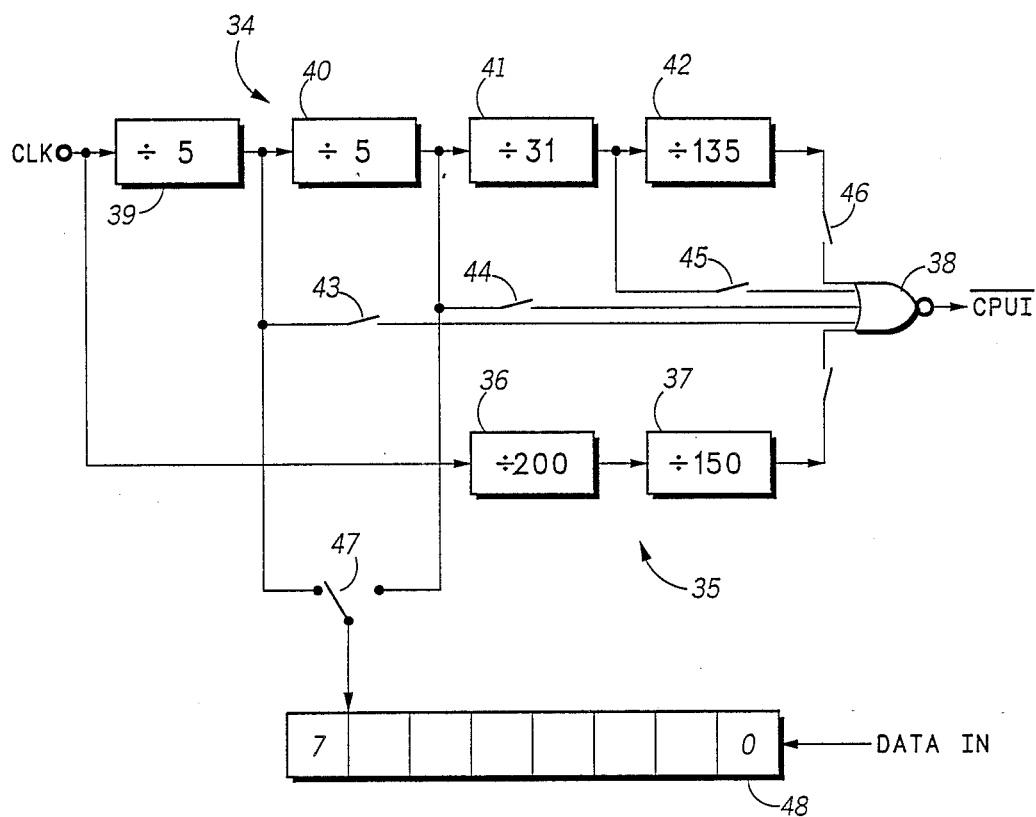
FIG. 4 illustrates the use of a timer according to the invention for serial data acquisition in a pager.

The timer architecture shown in FIG. 4 is similar to that of FIG. 1 in that it also comprises a single input clock CLK. In this case, the clock CLK is a crystal oscillator with a frequency of 30 KHz and the second series-coupled timer 35 comprises two modulo counters 36 and 37 arranged in series between the clock CLK and a NOR gate 38 providing the output $\overline{CPUI}$. The counters 36 and 37 have moduli of 200 and 150 respectively giving a frequency at the output of counter 37 of 1 Hz, thus giving a time-of-day output. The first series-coupled timer 34 comprises four modulo counters 39, 40, 41 and 42, the first counter 39 taking the clock CLK as its input and the other counters 40, 41 and 42 taking as their respective inputs the outputs of counters 39, 40 and 41 respectively. The outputs of each of the timers are also passed to the NOR gate 38 via switches 43, 44, 45 and 46 which are selected to give a desired interrupt frequency at the NOR gate 38. The counters 39, 40, 41 and 42 have moduli of 5, 5, 31 and 135 respectively and thus have output frequencies of 6 KHz, 1200 Hz, 38.7 Hz and 3.4375 Hz respectively. The first two frequencies are the sampling frequency and bit rate respectively and are therefore coupled via a switch 47 to a shift register 48 which inputs data at one of the two frequencies. The third timer 41 counts the number of bits to provide the word interval and the fourth timer 42 counts the number of words to bring the pages out of a battery saver.

The clocking of the shift register at the appropriate rate means that the microprocessor does not have to read an input port at a precise time and can therefore be working on other tasks without waiting for the next interrupt. Also, the processor is interrupted less often because a number of samples can be taken and stored in the shift register before interrupting the processor. Additional shift registers could also be added to aid in the transition between multiple samples per bit and single samples per bit. The flexibility of this timer architecture provides for similar configurations with modulo values that can be used to decode POCSAG, GSC, NTT or other algorithms.

This invention also solves another problem. If the modulo counters were simply hardwired in some fixed string, the test time can be extremely long. For example, if six 8-bit modulo timers were connected in a single string, it could take 273 years to test! This invention uses selectable clock inputs for each individual modulo counter. This not only provides great flexibility, but it also allows the counters to be coupled in parallel so that they can be tested in a few milliseconds.

Thus, what has been described is a timer which provides reliable, precise interrupts with virtually no processor overhead by combining several modulo counters with independently selectable clock sources for each counter.

What is claimed is:

1. A timer comprising output means;
   a plurality of modulo counters including a first and a second modulo counter with interrupts generated as a function of respective first and second different modulus values, each modulo counter having an input and an output; and
   means for configuring the outputs of said plurality of modulo counters into one of either first or second configurations, wherein the input of said first modulo counter is coupled to a clock source and the output of said first modulo counter is coupled to the input of said second modulo counter and that an output of said second modulo counter is coupled to said output means in the first configuration whereby interrupts are generated according to said first and second modulus values in series, and wherein the input of said second modulo counter is coupled to said clock source and the output of said second modulo counter is coupled to the input of said first modulo counter and that an output of said first modulo counter is coupled to said output means in said second configuration whereby interrupts are generated according to said second and first modulus values in series.

2. A timer according to claim 1 wherein said output means comprises a logic circuit.

3. A timer according to claim 2 wherein said configuring means reconfigures the modulus of said plurality of modulo counters such that the outputs of said plurality of modulo counters provide desired output timing signals.

4. A timer according to claim 2 wherein said configuring means includes means for interconnecting said plurality of modulo counters in a predetermined configuration.

5. A timer according to claim 4 wherein said interconnecting means includes a plurality of switches which are controlled by said configuring means to produce said predetermined configuration.

6. A timer according to claim 2 wherein said configuring means includes means for connecting the outputs of said plurality of modulo counters to said output means in a predetermined configuration.

7. A timer according to claim 6 wherein the outputs of said plurality of modulo counters are connected to said output means via a plurality of switches which are controlled by said configuring means to produce said predetermined configuration.

8. A timer according to claim 2 comprising two parallel sets of modulo counters, each set comprising a plurality of modulo counters coupled in series between said clock source and said output means and having their outputs coupled to said output means via switches controlled by said configuring means, the first set of modulo counters providing time-of-day timing signals to said output means and the second set of modulo counters providing data acquisition timing signals to said output means.

9. A timer according to claim 8 wherein said output means comprises a NOR gate which provides an output timing signal.

10. A timer according to claim 5 comprising a plurality of multiplexers, each of which connects the input of a modulo counter to the output of another modulo counter or to said clock source as desired.

11. A timer according to claim 10 wherein said output means comprises a logic circuit which produces an output timing signal in response to signals received from the outputs of said plurality of modulo counters.

* * * * *